Figure 1:
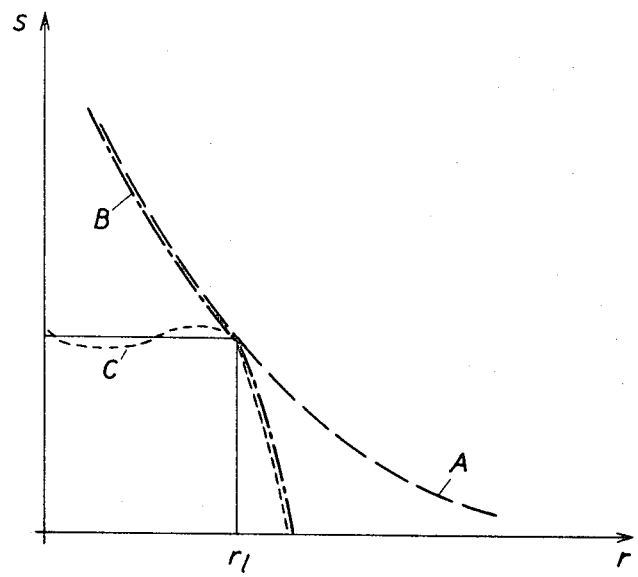

United States Patent [19]
Holmgren

[11] 3,725,925
[45] Apr. 3, 1973

[54] TRANSMITTER- AND RECEIVER ARRANGEMENT FOR DETECTION OF TARGETS WITHIN A LIMITED RANGE NEXT TO THE ARRANGEMENT

[75] Inventor: Nils Erik Börje Holmgren, Goteborg, Sweden

[73] Assignee: Telefonaktiebolaget LM Ericsson, Stockholm, Sweden

[22] Filed: Nov. 4, 1970

[21] Appl. No.: 86,800

[30] Foreign Application Priority Data

Nov. 6, 1969 Sweden..............................15233/69

[52] U.S. Cl..............................343/17.1 R, 343/7 PF
[51] Int. Cl.................................................G01s 7/28
[58] Field of Search.........................343/7 PF, 17.1 R

[56] References Cited

UNITED STATES PATENTS 2,782,412  2/1957  Brockner.....................343/17.1 R X
3,353,179  11/1967  Cartwright..................343/17.1 R X Primary Examiner—T. H. Tubbesing
Attorney—Hane, Baxley & Spiecens

[57] ABSTRACT

Transmitter- and receiver arrangement for detection of targets situated within a limited range next to the arrangement by means of transmitted and target reflected pulses, whereby the amplitude of the reflected pulses decreases with the distance to the target. A pulsed transmitter is connected to the transmitter antenna of the transmitter and receiver arrangement and is controlled from a pulse generator so that pulses are fed periodically to the transmitter antenna. The pulse generator also controls an on-off circuit in the receiver part of the arrangement, the input of which circuit via a low-pass filter is connected to a receiver which in its turn is connected to a receiver antenna. During a certain short time interval in conjunction with the trailing edge of the transmitted pulse the pulse generator opens the on-off circuit allowing a received signal to be fed to the signal processing circuit of the receiver. By selecting the cut-off frequency of the low-pass filter and the time interval during which the gate is open in a suitable manner a compensation of the distance dependent amplitude of the echo signal can be achieved.

3 Claims, 3 Drawing Figures

INVENTOR
NILS ERIK BÖRJE HOLMGREN

TRANSMITTER- AND RECEIVER ARRANGEMENT FOR DETECTION OF TARGETS WITHIN A LIMITED RANGE NEXT TO THE ARRANGEMENT

The present invention relates to a transmitter- and receiver arrangement for the detection of targets situated within a limited range adjacent the arrangement by means of transmitted and target reflected pulses, whereby the amplitude of the reflected pulses decreases with the distance to the targets.

With for example, projectiles, which are fired towards an airplane target, a need exists for causing the projectile to detonate, even if it does not hit but only passes the target within a certain distance. For this purpose different types of arrangements are used which indicate objects within a certain well-defined distance. These arrangements are usually called proximity fuzes. The proximity fuzes can either be passive, for example of IR-type with detectors, which are sensitive to the thermal radiation which is produced for example by the exhaust gas flames of airplanes, or also active, usually some kind of radar equipment. The demand put on the radar equipment in such a case is that it shall have an approximate constant sensitivity for echos from targets within a certain range next to the radar receiver and be insensitive for echos which originate from targets outside this range. Furthermore it is essential that the transmitted radar signals are not fed by leakage directly into the signal treatment circuits of the receiver.

If a pulse radar equipment is used, it can, by means of a gate circuit in the receiver, which is closed (so that no signal passes) a certain time after each pulse has been transmitted, easily block echo signals which originate from targets outside a certain distance range. However within this range a strong distance dependent sensitivity is obtained in the receiver, as the amplitude of the received pulses quickly decrease with the distance to the target. A known method to avoid this problem and which is used by pulse radar equipments intended for larger distance ranges, relies on a compensation whereby the distance dependent sensitivity is compensated by means of a time controlled amplifier connected into the receiver, i.e., an amplifier which during the pulse intervals gradually increases its amplification. With proximity fuzes in projectiles it is difficult to execute the rapid amplification adjustment, which is required at the small distances, i.e., short times, which are present, because the apparatus for such a solution becomes too expensive and space demanding. An object of the present invention is therefore to provide a pulse radar arrangement which has a constant sensitivity for echo signals which originate from targets within a limited range adjacent the arrangement and which is essentially insensitive to echos which originate from targets situated outside this range. Furthermore the arrangement prevents the transmitted pulses from reaching by leakage the signal processing circuits of the receiver. The characteristics of the arrangement will be apparent from the appended claims.

Figure 2:
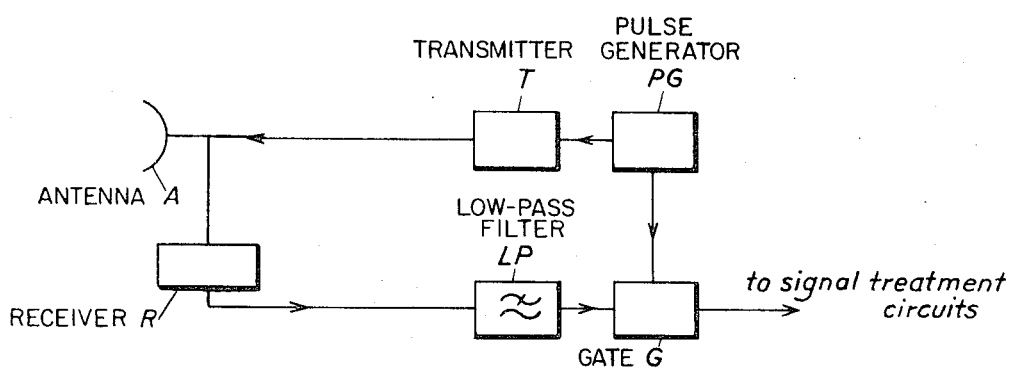
Figure 3:
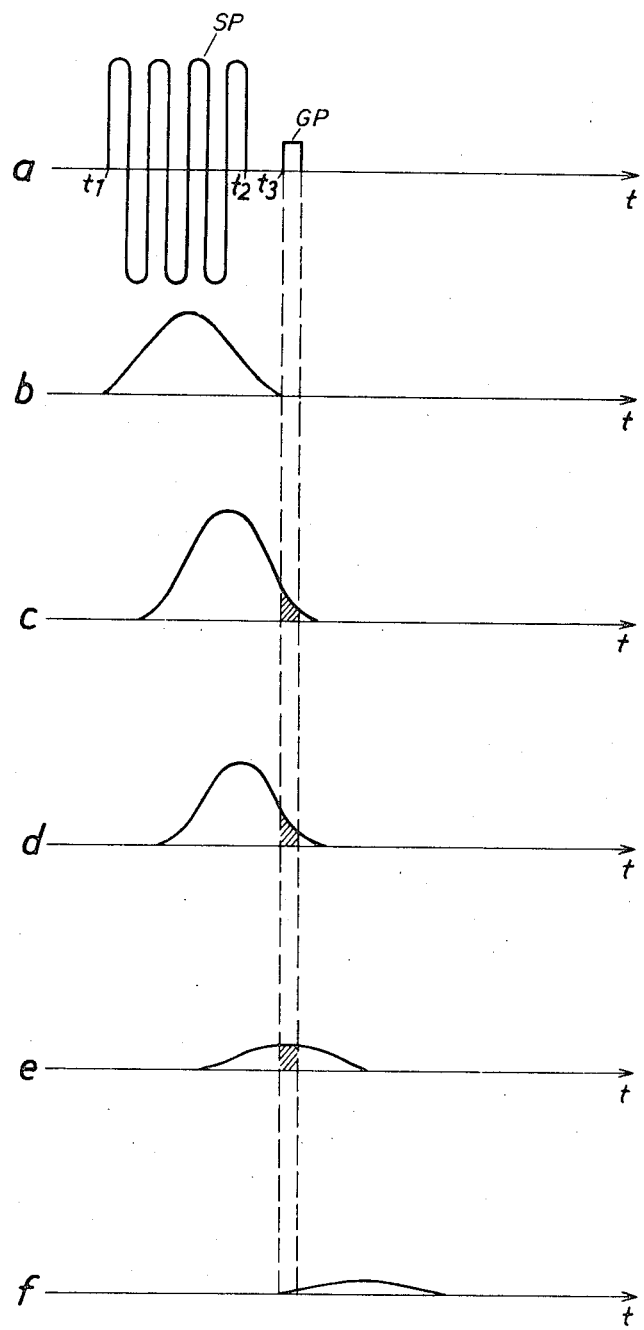

The invention will be explained in greater detail with reference to the accompanying drawing, in which FIG. 1 shows a graph of the sensitivity as a function of the distance in some known radar arrangements and in the arrangement according to the invention, FIG. 2 shows a block diagram of an arrangement according to the invention and FIG. 3 shows diagram of pulses transmitted from the arrangement and pulses obtained from targets situated at different distances.

In FIG. 1, which shows the sensitivity S as a function of target distance $r$ for several different types of radar equipments, the solid line curve indicates the ideal characteristic of a proximity fuse. Curve A indicates the sensitivity which is obtained with the usual pulse radar. As is known, the sensitivity in such a case decreases approximately with the fourth power of the distance. Curve B indicates the sensitivity which is obtained when the receiver of the pulse radar equipment is blocked by means of a gate circuit which is closed after a certain time corresponding to the distance $r_1$, which constitutes the outer limit of the desired sensitivity range. The varying sensitivity remains, however, within the distance range of interest and the known methods which are used in order to compensate for this are, as mentioned in the introduction, not adapted for use in proximity fuses. Curve C, finally, shows an example of the characteristic, which is obtained with the arrangement according to the invention, which will be explained more in detail in connection with FIG. 2 and 3.

In FIG. 2, which shows a block diagram of an arrangement according to the invention, a pulsed transmitter T is connected to the transmitter antenna A of a pulse radar arrangement. The pulsed transmitter is controlled from a pulse generator PG, so that pulses are fed periodically to the transmitter antenna. The pulse generator controls also a gate circuit (on-off circuit) G in the receiver part of the arrangement. The input of the gate is via a low-pass filter LP connected to a receiver R, which in its turn is connected to a receiver antenna, which can be identical with the transmitter antenna A, if the so-called duplex principle is used. The pulse generator PG opens the gate G (so that the signal can pass) during a certain short time interval which is related to the termination time of the transmitted pulse, so that received signal is fed to the signal treatment or processing circuits of the receiver. By choosing the limit frequency of the low-pass filter and the time interval, during which the gate is open, in a suitable manner, a compensation of the distance dependent amplitude of the echo signal can be achieved. Simultaneously the risk, that the transmitter pulse will by direct leakage between the transmitter and the receiver reach the signal treatment circuits, is eliminated. How this is achieved will be explained in greater detail by means of FIG. 3.

Waveform $a$ of FIG. 3 shows a high frequency transmitter pulse or wave packet SP transmitted from the pulse transmitter T between the points of time $t1$ and $t2$, and an opening pulse GP from the pulse generator PG to the gate circuit G at the time $t3$. Waveforms $b$ to $f$ of FIG. 3 show several different examples of pulses which pass from the receiver, via the low-pass filter LP to the input of the gate circuit G. It is assumed that a rectification and envelope detection occur in the receiver. In waveform $b$ the leakage pulse is shown, which is obtained from the receiver because of the leakage which generally occurs between the transmitter and the receiver. This pulse occurs, in principle, simultaneously with the transmitter pulse but is, among other things, because the low-pass filter LP deformed in comparison with the transmitter pulse, is present for a longer time. The point of time $t3$ therefore should be chosen so that the amplitude of the leakage pulse at this point of time can be neglected. In waveform $e$ to $f$ pulses are shown, which reach the receiver after reflection from a target situated very near to the receiver, in the middle of the distance range of interest and outside the outer limit of the distance range respectively. As appears from the figures the pulse amplitude directly decreases with the distance to the target. The effect of this will, however, be compensated because the low-pass filter LP modifies the decay time of the received pulse. Thus the energy which passes the gate circuit will, as appears from waveform $e$, $d$ and $e$, be approximately as large whatever the target distance. Of course a complete compensation will not be obtained within whole the distance range of interest, but by chosing the limit frequency of the low-pass filter and the time, during which the gate circuit is closed, in a suitable manner a sensitivity characteristic can be obtained which closely approximates the ideal characteristic for a proximity fuse shown in FIG. 1. A further improvement can furthermore be obtained if the pulse transmitter T is constructed so, that the transmitted pulse has a gradually decreasing amplitude, so that the large leading part of the pulse is detected at detection of target from large distances, and the detection point then gradually is moved towards a later part of the pulse, which is smaller, with decreasing target distance.

The invention is of course not limited to any special type of pulse radar. Thus the invention can also be utilized with pulse radar with pure amplitude demodulation as well as different types of pulse doppler radars. Also distance measurement arrangements, which do not constitute conventional radar equipments, for example a pulsed laser distance meter, are of course within the scope of the invention. We claim:

1. Transmitter- and receiver arrangement for detection of targets situated within a limited range next to the arrangement by means of transmitted and target-reflected pulses, whereby the amplitude of the reflected pulses decrease with the distance to the targets, the arrangement comprising: a pulse generator; a pulse transmitter controlled by said pulse generator; a transmitter antenna connected to said pulse transmitter; an on-off circuit controlled by said pulse generator which emits to the on-off circuit an on pulse in conjunction with the termination of each transmitted pulse; and a low-pass filter having an output connected to the input of said on-off circuit and having an input connected to the output of the receiver part of the arrangement, the low-pass filter increasing the duration of the trailing edge of the received pulse for causing a compensation of the distance-dependent amplitude of the output signal of the on-off circuit for reflections directly from targets, so that the sensitivity of the arrangement is in the main constant within said range and in the main equal to zero outside said range.

2. Arrangement according to claim 1, the on-off circuit being kept on during a time which is essentially shorter than the transmitter pulse width.

3. Arrangement according to claim 1 wherein the pulse transmitter is so constituted, that the transmitted pulse has a gradually decreasing amplitude, whereby a further compensation of the distance dependence of the signal obtained at the output of the on-off circuit is obtained.

* * * * *